March 27, 1962

W. T. FURGERSON ETAL 3,027,143

APPARATUS FOR IMPROVING HYDRODYNAMIC
CONDITIONS WITHIN A CONDUIT

Filed Nov. 1, 1960

INVENTORS.
William T. Furgerson
Garland Samuels, Jr.

BY

*Roland A. Anderson*

ATTORNEY.

United States Patent Office 3,027,143
Patented Mar. 27, 1962

3,027,143
APPARATUS FOR IMPROVING HYDRODYNAMIC CONDITIONS WITHIN A CONDUIT
William T. Furgerson, San Diego, Calif., and Garland Samuels, Jr., Oak Ridge, Tenn., assignors to the United States of America as represented by the United States Atomic Energy Commission
Filed Nov. 1, 1960, Ser. No. 66,681
4 Claims. (Cl. 257—250)

Our invention relates to a novel header arrangement for improving the hydrodynamic conditions within a divergent annular passageway.

As a fluid turbulently flows through a channel along a solid boundary or surface, there is a very thin layer of fluid which adheres to the surface and thus has a zero velocity with respect to that surface. Some distance away from the surface in the central portion of the channel there exists a region of fluid having substantially a constant velocity. Between the central region of constant velocity and the wall layer of zero velocity there is an intermediate region which displays a velocity gradient with respect to the channel radius. This intermediate region of velocity variation is called the boundary layer.

In the flow of fluids through divergent passageways, it has been established that the flow therethrough is subject to the growth and eventual separation and reversal of the boundary layer. The growth phenomenon of a boundary layer is almost self explanatory. It is the actual thickening or growth of a boundary layer. The separation of the boundary layer can be explained as follows: the flow in a diverging channel may be unstable if the angle of divergence is appreciable. The flow involves the conversion of velocity head to pressure head. In a diverging channel some of the kinetic energy is dissipated into unavailable thermal energy because of the viscosity of the fluid. Thus the advancing stream of fluid may not completely fill the channel and separation of the boundary layer may take place. The term "reversal of the boundary layer" refers to the phenomenon of an actual reversal in the direction of flow in the boundary layer. As the boundary layer moves through a divergent channel, it exhibits the following characteristics successively: (a) flow velocity in the boundary layer is reduced, that is, the boundary layer thickens or growth occurs; (b) separation of the boundary layer then occurs when the velocity distribution curve becomes normal to the wall; and (c) there is a reversal of flow in the boundary layer with the resultant formation of eddies.

For some applications of divergencies these boundary phenomena are very undesirable. The probability of the occurrence of these phenomena increases as the degree of divergence, as represented by the inlet to outlet area ratio, and the rate of divergence, as represented by the equivalent cone angle, are increased. Common industrial practice calls for divergence rates to be of the order of 7–10 degrees included angle when preceded by several diameters straight run of pipe. Where care has been taken to achieve a symmetrical velocity profile with thin boundary layers at the inlet, non-reversed flow has been obtained in divergent channels having a 20° equivalent cone angle with an area ratio, that is, an inlet area to outlet area ratio, of 2:1. It has, therefore, been impossible in the prior art to achieve divergencies greater than 20° equivalent cone angle without the appearance of the undesirable phenomena which have been described above.

It was stated previously that the phenomena of boundary growth, separation, and reversal were very undesirable in certain applications. This is especially true where energy is being generated within the fluid flowing within the divergency. In fluid fueled neutronic reactors fission energy is released in the fuel. The boundary growth, separation, and reversal with the resultant eddies within a fluid containing a fissionable fuel will occasion regions of excessive temperature or "hot spots." It is essential in fluid fueled neutronic reactors to avoid these areas of excessive temperature.

It is, therefore, a general object of our invention to provide means for improving the hydrodynamic condition within a divergent passageway.

Another object of our invention is to provide means for eliminating the phenomena of boundary growth, boundary separation, and boundary flow reversal within a divergent passageway having an equivalent cone angle greater than 20°.

Another object of our invention is to provide hydrodynamic improving means within the core of a fluid fueled neutronic reactor, thereby eliminating hydrodynamic phenomena which result in the formation of localized stagnant areas of fuel bearing fluid.

These and other objects of our invention will become apparent from the following detailed description taken in connection with the accompanying drawings wherein.

In accordance with our invention, we provide a header disposed at the inlet end of an annular divergency adapted to distribute a rotational fluid flow across that inlet end, means mounted adjacent the inlet end to establish within the divergent passageway a solid body rotation having both a rotational component of fluid velocity and an axial component of fluid velocity in the direction of the divergence, means to direct a substantial portion of the inlet flow toward both walls of the divergent annulus and, in addition, means to direct a substantially greater portion of the inlet flow toward one wall of the divergent annular passageway than toward the other wall.

Figure 1:
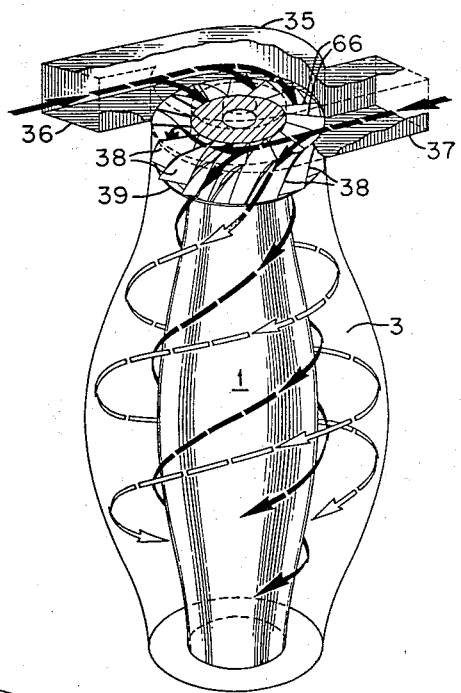
FIG. 1 is a pictorial view of the fuel annulus of a reactor showing the header arrangement at the inlet to the fuel annulus.

Reference numeral 3 in FIG. 1 illustrates a typical divergent annular passageway. In the embodiment shown, the passageway becomes convergent after the divergency, which in no way affects the scope of our invention.

We have found generally that hydrodynamic conditions in such passageways as are illustrated by FIG. 1 are most favorable when a solid body type rotational flow exists in the divergency. The term "solid body flow," when applied to rotational flow, means that the rotational velocity component of the flowing fluid ($V_R$) is related to the distance ($r$) from the center of rotation by the expression $V_R = kr$, where $k$ is a constant. With respect to rotational flow, a rotating fluid, which flows according to the above expression, rotates as a solid body (e.g., a phonograph record).

In most divergent passageways, including the one illustrated in FIG. 1, it is necessary that a finite amount of fluid be passed axially therethrough. It is obvious, therefore, that an axial component ($V_A$) of velocity be present in addition to the rotational component described above. The axial component of velocity in flow systems to which our invention is applicable may be variable with respect to distance from the center of rotation ($r$), without affecting the improvements effected by the solid body rotational flow. Since the rotational component of velocity ($V_R$) is variable with respect to $r$ and the axial component ($V_A$) may be variable, in most situations both the magnitude and direction of the resultant flow (V) is variable.

We have discovered that while the solid body type rotation generally improves flow conditions, the improvement effected is not entirely satisfactory, especially when applied to divergencies found in the neutronic reactor art. We have found that all flow defects can be eliminated on either wall of the annular divergency, but not on both walls simultaneously. There is an angle between the axis of the divergency and the average resultant velocity (V), at which flow defects on both walls are minimized. As that angle is decreased, flow defects on the inner annulus wall are eliminated while the defects become worse on the outer wall. Conversely, if the angle is increased, the defects on the outer wall are eliminated while the defects near the inner wall become worse. We have solved this problem by setting the average angle at a value such that all flow defects are eliminated on one wall and have introduced other elements to improve conditions on the other wall.

These other elements of our invention comprise means to direct a portion of the flow toward both annulus walls and means to direct a substantially greater portion toward one wall than the other, the wall toward which the greater portion is directed being the wall at which the defects were not eliminated by solid body flow. Preferably, this flow direction is provided by the structure of the vane (i.e., being thickest along a line midway between the annulus walls), and by a drag ring mounted on the bottom of the vane system.

Figure 2:
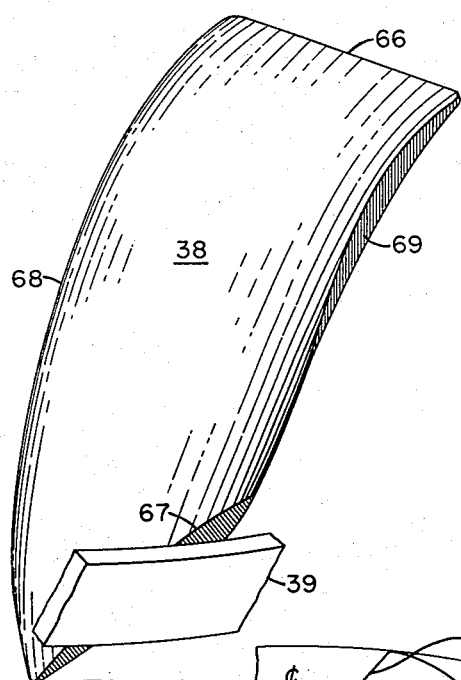
FIG. 2 is a view of one vane used in the header shown in FIG. 1.
Figure 3:
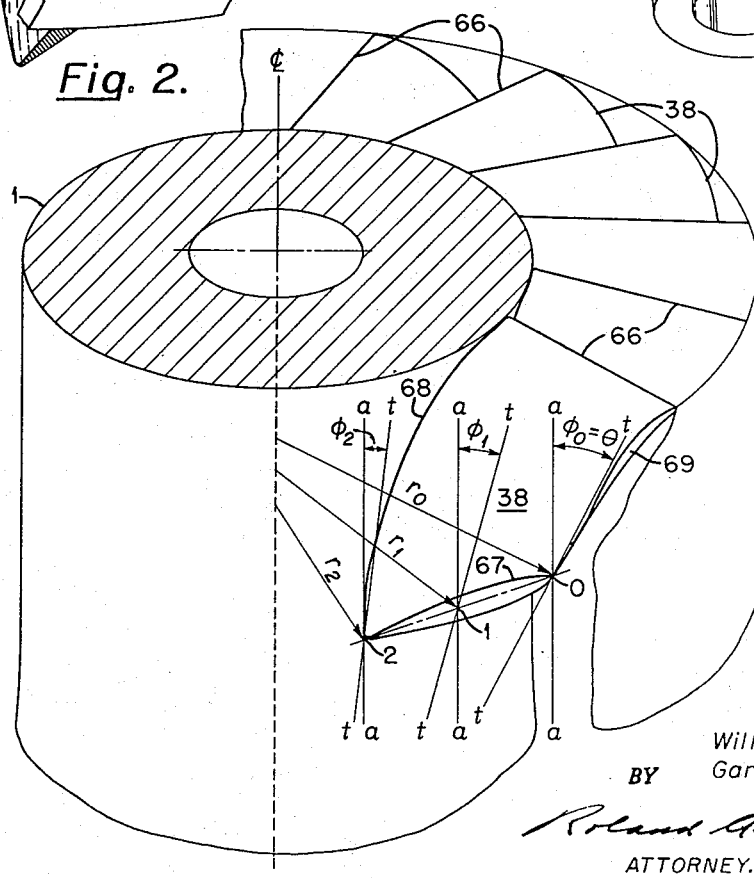
FIG. 3 is a partial pictorial view just below the header of FIG. 1 and showing the parameters $\phi$, $r$, $r_0$ and $\theta$.

Referring to FIGS. 1, 2 and 3, which illustrate one embodiment of our invention, a header assembly comprising tangential inlet ducts 36 and 37, vanes 38 and a drag ring 39 supply a fluid to a divergent annular passageway 3. In FIGS. 1 and 3 the vanes 38 are shown only schematically. However, the true configuration is shown in an actual perspective view of one vane in FIG. 2. Liquid is supplied to the portion of the header above the vanes by inlet ducts 36 and 37 and a rotating supply of liquid is maintained at all times in that portion. It can be seen in FIG. 1 that the bottom of the inlet ducts 36 and 37 are flush with the top portion 66 of the vanes 38. The vanes 38 in the annulus are substantially parallel to each other. A portion of the rotating supply of liquid in the header above the vanes 38 is directed downwardly by the vanes through a variable angle as described below. Although the rotating liquid below the vanes flows as a forced vortex, the inlet flow very nearly approximates a free vortex where $$V_R = \frac{k}{r}$$

where: $V_R$ is linear rotational velocity of the liquid at a point in the rotating body; $r$ is the distance of that point from the center of rotation; and $k$ is a constant. The vanes establish a solid body rotational flow within passageway 3 by converting a variable amount (dependent upon $r$) of the rotational velocity, which exists in the rotating supply above the vanes, into axial velocity so that the rotational component of velocity in the liquid under the vanes is defined by: $V_R = kr$. The conversion of a variable amount of rotational velocity is accomplished by turning the incoming liquid, by means of the vanes, downwardly through a variable angle. The angle at which liquid leaves the trailing edge of the vanes is varied from a relatively shallow angle at the outer annulus wall, where the largest rotational component is desired, to a relatively steep angle at the inner annulus wall, where the smallest rotational component is desired. The black and white flow lines shown in FIG. 1 are illustrative of the variable flow angle. We have found that solid body rotational flow is established when liquid leaves the trailing edge of the vanes in the annular inlet according to the following expression:

$$\tan \phi = \frac{1}{\sqrt{\frac{1+2\tan^2 \theta}{\tan^2 \theta}\left(\frac{r_0^2}{r^2}\right) - 2}}$$

where:

$\phi$=the angle at any point along the trailing edge of the midplane of said vane, between the axis of the annular divergency and a line tangent to said point;

$r$=distance between said point and the axis of said annular divergency;

$r_0$=distance between the axis of said annular divergency and the outer wall of the inlet;

$\theta = \phi$ at $r_0$.

FIG. 3 shows the above parameters $\phi$, $r$, $r_0$ and $\theta$. It should be noted that for any selected mounting position for the parallel mounted vanes 38 in any given annulus, the values of the parameters $r_2$, $r_0$, $\phi_2$, $\phi_0$, and $\theta$ remain constant for each of the vanes. The values of $r_1$ and $\phi_1$ will vary for each point along the line 0—1—2. The line 0—1—2 is the edge of the elliptically curved midplane through each of the vanes 38. The tangent lines $t$—$t$ in FIG. 3 are drawn tangent to this curved midplane at each of the points 0, 1, and 2. The tangent line $t$—$t$ at point 1 will form a plurality of different angles $\phi_1$ with a corresponding axis line $a$—$a$ as point 1 is moved in either direction from that shown along the line 0—1—2. In FIG. 3, it can be seen that $\phi$ in each instance is the angle between a tangent line $t$—$t$ and a line $a$—$a$ that is parallel to the axial center line of member 1, and that $\phi$ becomes larger as the distance $r$ from this axial center line increases. $\theta$ is merely $\phi$ at $r_0$. There is a different value for each of $r_1$ and $\phi_1$ for each position of point 1 along the line 0—1—2.

In FIG. 3, the walls of the annulus are partially shown and the edges 68 and 69 of each of vanes 38 are affixed to the respective walls of the annulus to hold the vanes in place within the annulus.

Referring now to FIG. 2 singularly, a single vane 38 is shown. The vane is adapted to be positioned within the inlet to the annular divergence so that 66 is the leading edge, 67 is the trailing edge, side 68 is attached to the inner annulus wall, and side 69 is attached to the outer annulus wall. The vane has an airfoil-like configuration in longitudinal cross-section which varies in thickness from a thin leading edge 66 to a blunt trailing edge 67. The thickness of the vane also varies in the transverse direction from its greatest thickness midway between edges 68 and 69 to its smallest thickness at the edges.

Liquid flows downwardly on the surface shown from the leading edge 66 to the trailing edge 67. The angle at which the liquid leaves the trailing edge changes from a relatively steep angle at side 68 to a more shallow angle at side 69, thereby establishing a solid body rotational flow in the liquid leaving the edge. This variable angle is formed at edge 67 because all longitudinal lines on the curved plane (i.e., a plane which has been curved) on which the vane is formed, which are parallel to edge 69, are congruent with the edge of one quadrant of a 2:1 ellipse, edge 66 being near the terminal point of the major axis and edge 67 being near the terminal point of the minor axis of the ellipse. Since the longitudinal lines parallel to edge 69 become longer as the curved plane is traversed from edge 69 to 68 (i.e., the lines are cut nearer the terminal point of the minor elliptical axis as edge 68 is approached), the slope of the lines at the trailing edge changes from a relatively steep slope at edge 68 to a less steep slope at edge 69. The angle at which the trailing edge 67 is cut with respect to said edge 69 determines the rate of change of the angle at which a liquid would leave the trailing edge. At the trailing edge the slope of the longitudinal lines with respect to the axis of the divergency is defined as follows:

$$\tan \phi = \frac{1}{\sqrt{\frac{1+2\tan^2 \theta}{\tan^2 \theta}\left(\frac{r_0^2}{r^2}\right) - 2}}$$

where:

$\phi$=the angle at any point along the trailing edge of the midplane of said vane, between the axis of the annular divergency and a line tangent to said point;

$r$=distance between said point and the axis of said annular divergency;

$r_0$=distance between the axis of said annular divergency and the outer wall of the inlet;

$\theta=\phi$ at $r_0$.

The thickness of each vane is longitudinally variable so that the two major surfaces of each vane are not parallel to each other or to the elliptically curved midplane. Consequently, the longitudinal tangent lines to the major surfaces at the trailing edge are nearly but not exactly parallel to the tangent lines on the midplane which determine the discharge angle. The longitudinal thickening of the vanes serves merely to establish optimum flow conditions between vanes and does not affect the over-all effect of the midplane curvature on the discharge angle.

It should be obvious that there are many shapes of vanes which will discharge liquid according to the equation above. For example, the vane may be warped so that the angle of discharge varies as $r$, and the vanes need not be cut transversely on an angle at their trailing edges.

As was stated before, we found that there exists an average angle, at which liquid leaves the vanes, at which flow defects are minimized on both walls, and that small deviations from that angle eliminated defects on one wall only. Rather than using an average angle in the equation above, we have used the angle at the outer wall ($\theta$) as a "bench mark." $\theta$ must be determined experimentally for each divergency to which our invention is to be applied. The tangent of the experimental $\theta$ may then be substituted in the above equation and $\phi$ at any radius evaluated. For the divergency described herein, we have found that a $\theta$ value of 20° completely eliminates flow defects on the outer wall.

To eliminate flow defects on the inner wall which were not corrected by solid body rotation, we have modified the vanes and attached a drag ring 39 to the trailing edge. The vanes are thickened from the elliptical base plane so that they are of greatest thickness along the longitudinal line midway between the inlet annulus walls and become thinner at their edges (68 and 69). This feature directs a portion of the flow toward both walls by introducing a small radial component of velocity. By means of the drag ring 39, a substantial portion of the flow is directed toward the inner wall thereby eliminating defects on that wall. The radial position of the drag ring must be determined experimentally for each divergency configuration. (Flow conditions are determined experimentally in prototype divergencies using probe type measurement and dye injection techniques.)

Our invention is particularly applicable to fluid fueled reactors such as the reactor described in the co-pending application of common assignee, Serial No. 699,428, filed November 27, 1957, in the names of Arthur P. Fraas and Carroll B. Mills for "Neutronic Reactor." The description of the reactor contained therein and the description of its utilization of our invention are hereby incorporated herein.

The above description of our invention was intended to be merely illustrative of one embodiment thereof and should not be interpreted in a limiting sense. Our invention should be limited only as indicated in the following claims.

What is claimed is:

1. In liquid flow systems having a divergent annular passageway preceded by a cylindrical annular inlet, an apparatus for improving flow characteristics in said passageway comprising, in combination, a multiplicity of arcuate vanes disposed within said inlet and rigidly attached to the walls thereof, the angle between longitudinal lines tangent to the midplane of said vanes and the axis of said passageway being of decreasing magnitude from the leading edges to the trailing edges of said vanes and being determined at said trailing edges by the expression:

$$\tan \phi = \frac{1}{\sqrt{\frac{1+2\tan^2 \theta}{\tan^2 \theta}\left(\frac{r_0^2}{r^2}\right)-2}}$$

where:

$\phi$=the angle, at any point along the trailing edge of the midplane of said vane, between the axis of the annular divergency and a line tangent to said point;

$r$=distance between said point and the axis of said annular divergency;

$r_0$=distance between the axis of said annular divergency and the outer wall of said inlet;

$\theta=\phi$ at $r_0$;

a header mounted adjacent the leading edge of said vanes to distribute a liquid uniformly to said vanes; and means to direct a substantial portion of a liquid flowing through said vanes toward one wall of said divergent passageway.

2. The apparatus of claim 1 wherein the thickness of each vane varies in the longitudinal direction from a thin leading edge to a relatively thick trailing edge.

3. The apparatus of claim 2 wherein the thickness of each vane varies transversely from a relatively small thickness at its point of attachment to the walls of said inlet to a relatively large thickness along a line midway between said walls.

4. The apparatus of claim 3 wherein said liquid directing means is a ring attached to the trailing edges of said vanes and sloped toward one wall of said passageway.

References Cited in the file of this patent

UNITED STATES PATENTS

| | | |
|---|---|---|
| 2,945,794 | Winters et al. | July 19, 1960 |
| 2,991,980 | Fraas et al. | July 11, 1961 |